US008813205B2

(12) United States Patent
Deshmukh et al.

(10) Patent No.: US 8,813,205 B2
(45) Date of Patent: *Aug. 19, 2014

(54) CONSOLIDATING DISPARATE CLOUD SERVICE DATA AND BEHAVIOR BASED ON TRUST RELATIONSHIPS BETWEEN CLOUD SERVICES

(75) Inventors: Abhijit Deshmukh, Pune (IN); Anurag Srivastava, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,486

(22) Filed: Feb. 6, 2012

(65) Prior Publication Data

US 2013/0205383 A1 Aug. 8, 2013

(51) Int. Cl.
  *H04L 29/06* (2006.01)
  *G06F 21/41* (2013.01)

(52) U.S. Cl.
  USPC ............................................. 726/8; 709/223

(58) Field of Classification Search
  USPC ........................................................... 728/8
  See application file for complete search history.

(56) References Cited

U.S. PATENT DOCUMENTS

| 7,631,346 | B2 | 12/2009 | Hinton et al. | |
| 7,657,639 | B2 * | 2/2010 | Hinton | 709/229 |
| 8,291,077 | B2 * | 10/2012 | l'Anson | 709/225 |
| 2004/0128544 | A1 * | 7/2004 | Hondo et al. | 713/201 |
| 2006/0129817 | A1 | 6/2006 | Borneman et al. | |
| 2008/0083040 | A1 * | 4/2008 | Dani et al. | 726/28 |
| 2009/0132395 | A1 * | 5/2009 | Lam et al. | 705/30 |
| 2009/0292797 | A1 * | 11/2009 | Cromp et al. | 709/223 |
| 2010/0017853 | A1 * | 1/2010 | Readshaw | 726/3 |
| 2010/0083222 | A1 * | 4/2010 | Maximilien et al. | 717/110 |
| 2010/0205196 | A1 * | 8/2010 | Schreiber et al. | 707/758 |
| 2010/0325199 | A1 * | 12/2010 | Park et al. | 709/203 |
| 2011/0016214 | A1 * | 1/2011 | Jackson | 709/226 |
| 2011/0022812 | A1 | 1/2011 | Van Der Linden et al. | |
| 2011/0047480 | A1 * | 2/2011 | Venkataraman | 715/748 |
| 2011/0125921 | A1 * | 5/2011 | Karenos et al. | 709/240 |

(Continued)

OTHER PUBLICATIONS

By Jack Suess and Kevin Morooney—"Identity Management & Trust Services" Foundations for Cloud Computing; pp. 1-10: Educause review—Sep./Oct. 2009.

(Continued)

*Primary Examiner* — Carolyn B Kosowski
*Assistant Examiner* — Jason C Chiang
(74) *Attorney, Agent, or Firm* — Patents on Demand P.A.; Brian K. Buchheit; Scott M. Garrett

(57) ABSTRACT

A method for consolidating cloud service data and behaviors can begin with the compilation of user/service membership data that associates requesting entities with subscribed cloud services by a trusted cloud service consolidator. A federated trust library housing inter-service trust information for the cloud services contained in the user/service membership data can be created. In response to a service request from a requesting entity, trusted secondary cloud services can be identified for the requesting entity. Identification of the trusted secondary cloud services can be based upon trust factors synthesized from data contained in the federated trust library. Data satisfying the service request and associated behaviors from each trusted secondary cloud service can then be consolidated into a unified data structure. A behavior can be an executable action supported by a trusted secondary cloud service. The unified data structure can be conveyed to the requesting entity in a service response.

12 Claims, 4 Drawing Sheets

(56) References Cited

U.S. PATENT DOCUMENTS

| | | |
|---|---|---|
| 2011/0137991 A1 | 6/2011 | Russell |
| 2011/0138034 A1 | 6/2011 | Brookbanks et al. |
| 2011/0231822 A1* | 9/2011 | Sabin et al. ................... 717/124 |
| 2012/0017085 A1* | 1/2012 | Carter et al. .................. 713/168 |
| 2012/0060165 A1* | 3/2012 | Clarke ........................... 718/104 |
| 2012/0060212 A1* | 3/2012 | Inoue .............................. 726/14 |
| 2012/0066018 A1* | 3/2012 | Piersol ......................... 705/7.14 |
| 2012/0089734 A1* | 4/2012 | Mercuri ........................ 709/226 |
| 2012/0130781 A1* | 5/2012 | Li ................................ 705/14.4 |
| 2012/0158821 A1* | 6/2012 | Barros .......................... 709/203 |
| 2012/0222084 A1* | 8/2012 | Beaty et al. ....................... 726/1 |
| 2012/0311564 A1* | 12/2012 | Khalid .............................. 718/1 |
| 2013/0031028 A1* | 1/2013 | Martin .......................... 705/400 |

OTHER PUBLICATIONS

By Aradhana, Inderveer Chana—"Trust Based Identity Provisioning for Cloud Computing" Source: Aug. 8, 2011; URL: http://dspace.thapar.edu:8080/dspace/bitstream/10266/1457/1/Aradhana+Thesis.PDF.

By: Wenjuan Ii and Lingdi Ping: "Trust Model to Enhance Security and Interoperability of Cloud Environment" Source: Cloud Computing Lecture Notes in Computer Science, 2009, vol. 5931/2009, 69-79.

* cited by examiner

CONSOLIDATING DISPARATE CLOUD SERVICE DATA AND BEHAVIOR BASED ON TRUST RELATIONSHIPS BETWEEN CLOUD SERVICES

BACKGROUND

The present invention relates to the field of cloud computing, and, more particularly, to consolidating disparate cloud service data and behavior based on trust relationships between cloud services.

Cloud computing and the use of cloud services in business models and processed is becoming increasingly commonplace. As such, the quantity of cloud services available to users and organizations has also increased. Users often subscribe to multiple cloud services that offer similar functionalities. For example, a user may frequently participate in blog-related discussions using multiple cloud services.

In such a situation, the user is required to interact with each cloud service independently and manually collate similar information from the various cloud services, which is time-consuming. In order to overcome this problem, some formal REST-based methods have been developed that allow single sign-on request handling between the user's cloud services. However, this approach lacks scalability and the ability to consolidate the behaviors provided by the cloud services.

BRIEF SUMMARY

One aspect of the present invention can include a method for consolidating cloud service data and behaviors. Such a method can begin with the compilation of user/service membership data that associates requesting entities with cloud services to which the requesting entities subscribe by a trusted cloud service consolidator. A federated trust library housing inter-service trust information for the cloud services contained in the user/service membership data can be created. In response to a service request from a requesting entity, trusted secondary cloud services can be identified for the requesting entity. The trusted secondary cloud services can correspond to those cloud services that are associated with the requesting entity in the user/service membership data. The trusted secondary cloud services may not be the target of the service request. Identification of the trusted secondary cloud services can be based upon trust factors synthesized from data contained in the federated trust library. Data satisfying the service request and associated behaviors from each trusted secondary cloud service can then be consolidated into a unified data structure. A behavior can be an executable action supported by a trusted secondary cloud service and can be executable upon the data satisfying the service request obtained from the trusted secondary cloud service. The unified data structure can be conveyed to the requesting entity in a service response.

Another aspect of the present invention can include a system for consolidating cloud service data and behaviors. Such a system can include cloud services, user/service membership data, a federated trust library, and a trusted cloud service consolidator. The cloud services can operate in a cloud computing environment and provide data and behaviors in response to service requests. The user/service membership data can associate requesting entities with the cloud services to which the requesting entities subscribe. The federated trust library can contain inter-service trust information for the cloud services contained in the user/service membership data. The trusted cloud service consolidator can be configured to selectively consolidate the data and behaviors from cloud services into a unified data structure in response to a service request. The cloud services can be selected based upon a trust factor synthesized from the federated trust library. The trust factor can be a quantification of a level of confidence between a cloud service specified in the service request and other cloud services that a requesting entity consumes, as defined in the user/service membership data.

Yet another aspect of the present invention can include a computer program product that includes a computer readable storage medium having embedded computer usable program code. The computer usable program code can be configured to compile user/service membership data that associates requesting entities with cloud services to which the requesting entities subscribe. The computer usable program code can be configured to create a federated trust library of inter-service trust information for the cloud services contained in the user/service membership data. The computer usable program code can be configured to, in response to a service request from a requesting entity, identify trusted secondary cloud services for the requesting entity. The trusted secondary cloud services can correspond to those cloud services that are associated with the requesting entity in the user/service membership data. The trusted secondary cloud services may not be a target of the service request. Identification can be based upon trust factors synthesized from data contained in the federated trust library. The computer usable program code can be configured to consolidate data satisfying the service request and associated behaviors from each trusted secondary cloud service into a unified data structure. A behavior can be an executable action supported by a trusted secondary cloud service and can be executed upon the data satisfying the service request obtained from the trusted secondary cloud service. The computer usable program code can be configured to convey the unified data structure to the requesting entity in a service response.

DETAILED DESCRIPTION

Figure 1:
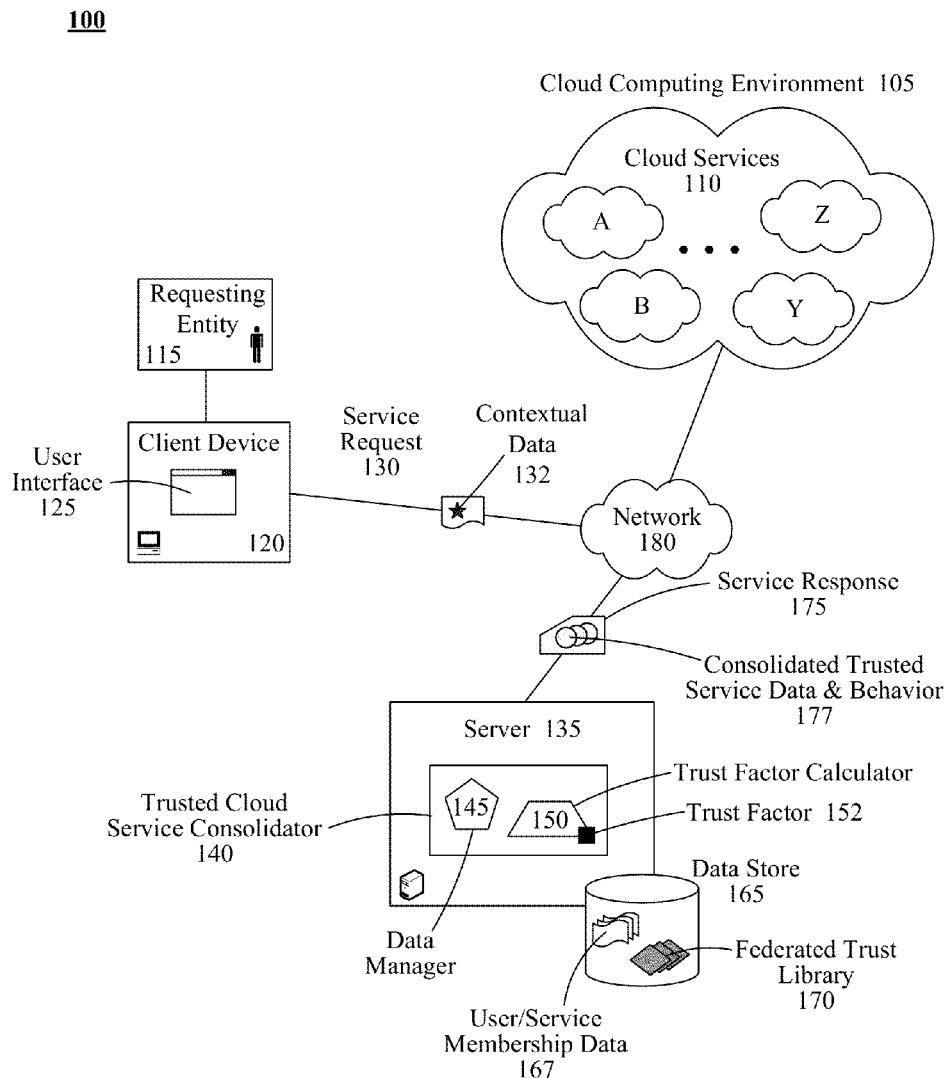
FIG. 1 is a schematic diagram illustrating a system that provides consolidated data and behavior from multiple trusted cloud services for unified consumption in accordance with embodiments of the inventive arrangements disclosed herein.

The present invention discloses a solution for consolidating cloud service data and behaviors for unified consumption by a requesting entity. A trusted cloud service consolidator can create and maintain user/service membership data for requesting entities and a federated trust library containing inter-service trust information for various cloud services used by the requesting entities. Upon receipt of a service request (i.e., at run-time), the trusted cloud service consolidator can determine a trust factor for the service request and trust factors for other cloud services consumed by the requesting entity that may have content applicable to the service request. Data and behaviors from the cloud services whose trust factor satisfies the trust factor of the service request can then be consolidated into a unified data structure and conveyed to the requesting entity.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 that provides consolidated data and behavior 177 from multiple trusted cloud services 110 for unified consumption in accordance with embodiments of the inventive arrangements disclosed herein. In system 100, a requesting entity 115 can receive a service response 175 containing consolidated trusted service data and behavior 177 in response to an issued service request 130.

The requesting entity 115 can represent a person, software application, or computing system that generates the service request 130. The requesting entity 115 can utilize a client device 120 to issue the service request 130. The client device 120 can be a computing device capable of communicating with the trusted cloud service consolidator 140 and the cloud computing environment 105 hosting the cloud services 110 over a network 180. The specific functionality provided by the client device 120 can be dependent upon the requesting entity 115.

As shown in system 100, the requesting entity 115 can be a person and the client device 120 can be a desktop computer. In this embodiment, the requesting entity 115 can perform actions in a user interface 125 that result in the generation of the service request 130 for a cloud service 110.

In an embodiment where the requesting entity 115 is a software application or process, the service request 130 can be automatically generated by the requesting entity 115 without the need for the user interface 125.

The service request 130 can be an electronic message soliciting the performance of a service provided by the cloud service 110. In addition to typical requesting entity 115 information (e.g., identifier, payment details), the service request 130 can also include contextual data 132.

The contextual data 132 can represent environmental and/or operating parameters of the requesting entity 115 and/or client device 120. Examples of contextual data 132 can include, but are not limited to, client device 120 type, client device 120 operating system, geographic location, client device 120 operating mode, network 180 being used, and so on.

Since the functionality of cloud services 110 and cloud computing environments 105 are well known in the art, only the specific details of these elements as they relate to the present disclosure shall be discussed herein. The cloud computing environment 105 can represent the hardware and/or software components required to support operation of one or more cloud services 110.

It should be noted that, although a single cloud computing environment 105 is shown in system 100, the cloud computing environment 105 can be comprised of multiple cloud computing environments 105 capable of communicating over the network 180. Further, the cloud computing environments 105 can be of varying types (e.g., private, public, hybrid, etc.) and it can be assumed that the appropriate authentication information is available to cloud services 110 that communicate across cloud computing environments 105 of differing types and/or security levels.

A cloud service 110 can be the hardware and/or software elements needed to perform and/or provide a specific functionality. Cloud services 110 can provide a variety of functionality to a requesting entity 115 (i.e., software as a service, infrastructure as a service, and platform as a service).

Further, the cloud computing environment 105 can host multiple cloud services 110 that provide various functionalities. Embodiments of the present disclosure can focus on situations where the requesting entity 115 utilizes multiple, similar cloud services 110.

For example, the requesting entity 115 can belong to three separate blogging sites and want to view blog entries containing the term "coconut". Conventional approaches can require the requesting entity 115 to access the cloud service 110 for each blogging site independently, resulting in three separate service requests 130 and three sets of search results.

Using system 100, the requesting entity 115 can issue a single service request 130 and the trusted cloud service consolidator 140 can provide a single result set that includes the search results from only trusted cloud services 110 as well as behaviors. The trusted cloud service consolidator 140 can be a software application configured to generate consolidated trusted service data and behavior 177 for a received service request 130.

As shown in system 100, the trusted cloud service consolidator 140 can operate from an appropriately-configured server 135 having a data store 165 that contains user/service membership data 167 and a federated trust library 170. The specific architecture and/or configuration of the trusted cloud service consolidator 140 can vary based upon implementation.

In one embodiment, the trusted cloud service consolidator 140 can be implemented as a Web service that operates from a Web server or as a cloud service 110 operating upon a cloud server 135 in the cloud computing environment 105. The requesting entity 115 can interact directly with the trusted cloud service consolidator 140 in this type of embodiment; the service request 130 can be addressed to the trusted cloud service consolidator 140.

This embodiment can be analogous to a meta-search engine—a single service given a service request that then compiles results from other cloud services.

In another embodiment, the trusted cloud service consolidator 140 can be a stand-alone component, as shown in system 100.

In yet another embodiment, the trusted cloud service consolidator 140 can be a component that is incorporated into an existing cloud service 110 (i.e., a plug-in). In such an embodiment, the trusted cloud service consolidator 140 can be invoked whenever the cloud service 110 receives a service request 130.

The trusted cloud service consolidator 140 can include a data manager 145 component and a trust factor calculator 150. The data manager 145 can represent the functions of the trusted cloud service consolidator 140 utilized in compiling and maintaining the user/service membership data 167 and federated trust library 170 that are used as the basis upon which the trusted cloud service consolidator 140 operates.

The user/service membership data 167 can record which cloud services 110 a requesting entity 115 subscribes (i.e., is a member of). The federated trust library 170 can be a repository for inter-service trust relationship information provided by the cloud services 110.

It should be emphasized that capturing the directionality of the relationship between the two cloud services 110 can be critical when using the inter-service the trust information contained in the federated trust library 170. That is, the level of trust between cloud service A 110 to cloud service B 110 can be different from the level of trust between cloud service B 110 to cloud service A 110.

The trust factor calculator 150 can be a component of the trusted cloud service consolidator 140 designed to quantify the trust between two cloud services 110 with respect to the requesting entity 115. The trust factor calculator 150 can be configured to determine the trust factor 152 of the requesting entity's 115 service request 130 and the trust factors 152 for the relationships between the requested cloud service 110 and secondary cloud services 110 whose data and behaviors are being consolidated. The trust factor 152 can be a quantification representing a level of confidence that one cloud service 110 has in the data from another cloud service 110.

Upon receipt of the service request 130, the trust factor calculator 150 can assess variables related to the service request 130, such as the contextual data 132. In an alternate embodiment, the trust factor 152 of the service request can be defined by the requesting entity 115.

A trust factor 152 can then be determined for the relationship between the requested cloud service 110 and the other cloud services 110 consumed by the requesting entity 115, as listed in the user/service membership data 167, by the trust factor calculator 150 using the information contained in the federated trust library 170.

For example, the trust factor 152 between cloud service A 110 and cloud services B, C, and D 110 can be 1, 3, 2, and 1, respectively. If the trust factor 152 calculated by the trust factor calculator 150 for an incoming service request 130 for cloud service A 110 is 1, then the consolidated trusted service data and behavior 177 created by the trusted cloud service consolidator 140 would include data and behaviors from cloud services A, B, and D 110.

In another embodiment, the calculation of the trust factor 152 by the trust factor calculator 150 can be influenced by additional parameters that are configurable by the requesting entity 115. For example, the requesting entity 115 can assign an importance (i.e., weight value) to the variables used by the trust factor calculator 150.

The consolidated trusted service data and behavior 177 can represent the data and behaviors (i.e., functions or actions) from the cloud services 110 that the trusted cloud service consolidator 140 has determined to be trustworthy for the requesting entity 115 and applicable to the service request 130. The consolidated trusted service data and behavior 177 can be encapsulated in a service response 175 and conveyed over the network 180 to the requesting entity 115.

Thus, the requesting entity 115 can view the consolidated trusted service data and behavior 177 in a unified format. Further, the requesting entity 115 can execute the behaviors associated with the source cloud service 110 upon the corresponding data, which is a functionality that is currently unavailable in conventional cloud service 110 aggregation approaches.

It is important to note that the determination of the trust factor 152 of the service request 130 and generation of the consolidated trusted service data and behavior 177 can occur at run-time. That is, these actions can be performed by the trusted cloud service consolidator 140 dynamically in response to the received service request 130.

Further, actions related to the creation and maintenance of the user/service membership data 167 and/or federated trust library 170 can be performed by the trusted cloud service consolidator 140 on an "as-needed" basis. Creation of these data collections 167 and 170 can occur prior to the activation of the trusted cloud service consolidator 140 and then updated as changes to the requesting entity 115 pool and their subscribed cloud services 110 occur.

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

As used herein, presented data store 165 can be a physical or virtual storage space configured to store digital information. Data store 165 can be physically implemented within any type of hardware including, but not limited to, a magnetic disk, an optical disk, a semiconductor memory, a digitally encoded plastic memory, a holographic memory, or any other recording medium. Data store 165 can be a stand-alone storage unit as well as a storage unit formed from a plurality of physical devices. Additionally, information can be stored within data store 165 in a variety of manners. For example, information can be stored within a database structure or can be stored within one or more files of a file storage system, where each file may or may not be indexed for information searching purposes. Further, data store 165 can utilize one or more encryption mechanisms to protect stored information from unauthorized access.

Figure 2:
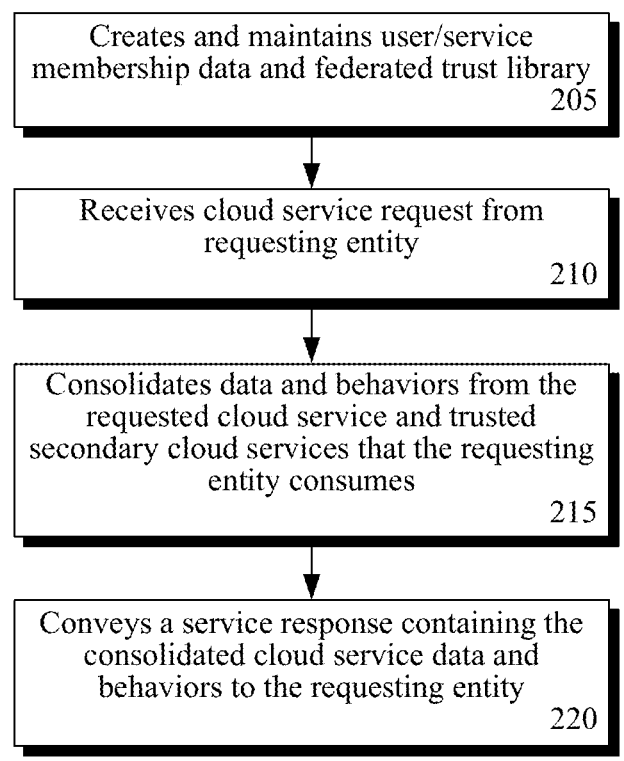
FIG. 2 is a flowchart of a method detailing, at a high-level, the operation of the trusted cloud service consolidator in accordance with an embodiment of the inventive arrangements disclosed herein.

FIG. 2 is a flowchart of a method 200 detailing, at a high-level, the operation of the trusted cloud service consolidator in accordance with embodiments of the inventive arrangements disclosed herein. Method 200 can be performed within the context of system 100.

Method 200 can begin in step 205 where the trusted cloud service consolidator can create and maintain the user/service membership data and federated trust library. Performance of step 205 can be achieved in a variety of ways that are commensurate with the specific implementation of the trusted cloud service consolidator, such as through a registration process.

In step 210, a cloud service request can be received from a requesting entity. Data and behaviors can then be consolidated from the requested cloud service and trusted secondary cloud services that the requesting entity also consumes in step 215. In step 220, a service response containing the consolidated trusted service data and behaviors can be conveyed to the requesting entity.

Figure 3:
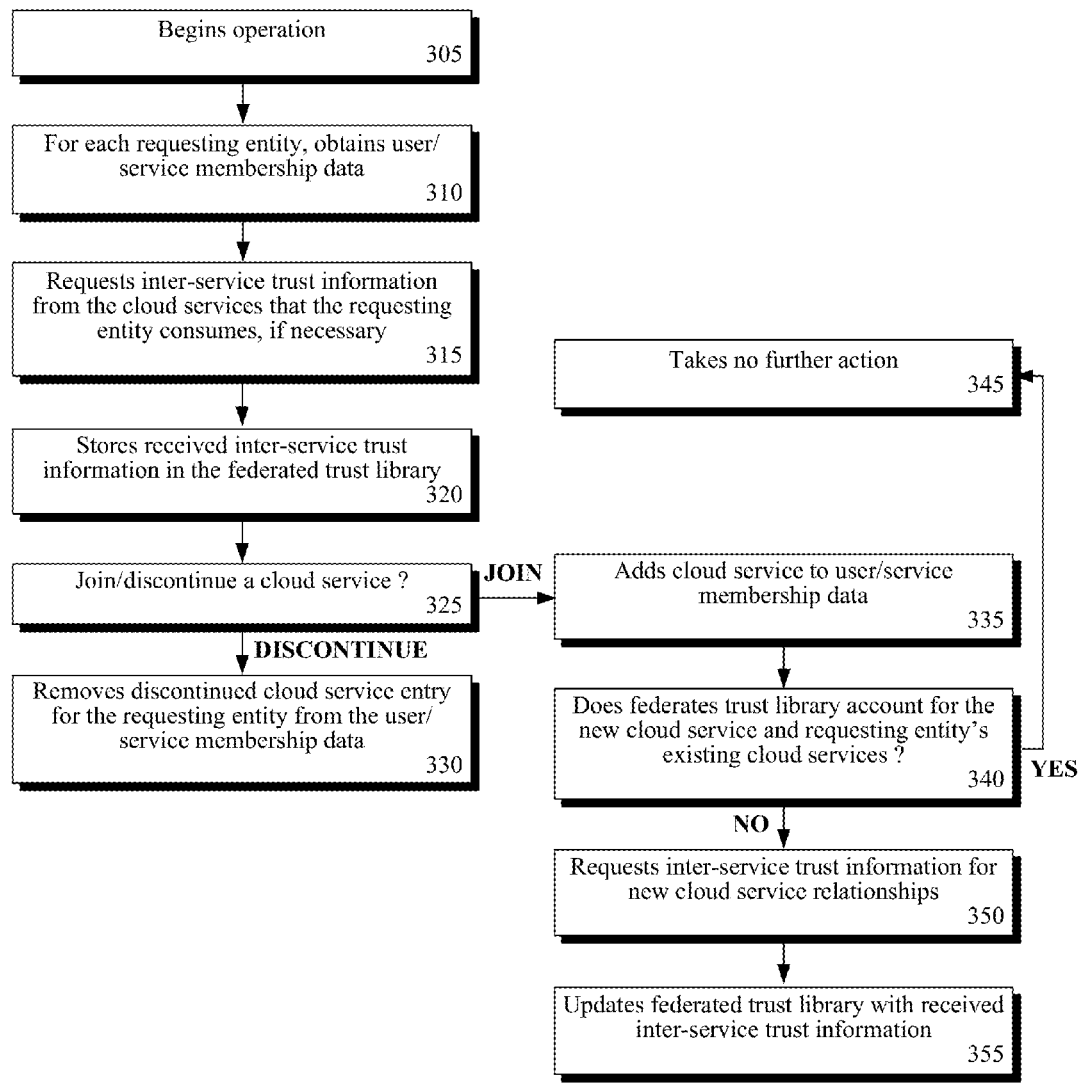
FIG. 3 is a flowchart of a method describing the creation and management of the user/service membership data and federated trust library by the trusted cloud service consolidator in accordance with an embodiment of the inventive arrangements disclosed herein.

FIG. 3 is a flowchart of a method 300 describing the creation and management of the user/service membership data and federated trust library by the trusted cloud service consolidator in accordance with embodiments of the inventive arrangements disclosed herein. Method 300 can be performed within the context of system 100 and/or as an embodiment of step 205 of method 200.

Method 300 can begin in step 305 where the trusted cloud service consolidator can begin operation. For illustrative purposes, it can be assumed that the trusted cloud service consolidator is being activated for the first time (i.e., the user/service membership data and federated trust library need to be created).

Values to populate the user/service membership data for each requesting entity can be obtained in step 310. The requesting entities, for which step 310 is executed, can vary based upon implementation.

For example, requesting entities can be required to submit information for the user/service membership data during a registration process for the trusted cloud service consolidator. Alternately, in the embodiment where the trusted cloud service consolidator is a component of a specific cloud service, the trusted cloud service consolidator can utilize a member listing for the cloud service and request information to populate the user/service membership data from the requesting entity, a public user registry, and/or other cloud services.

In step 315, inter-service trust information can be requested from the cloud services that the requesting entity, if necessary. Received inter-service trust information can be stored in the federated trust library in step 320.

In step 325, it can be determined if a requesting entity joined a new cloud service or has discontinued using an existing cloud service. When a requesting entity has discontinued using a cloud service, the entry for the discontinued cloud service can be removed from the user/service membership data in step 330. Alternately, step 330 can be configured to mark the entry as discontinued or deactivated.

It is important to note that the federated trust library is unaffected when a requesting entity discontinues using a cloud service, as that same cloud service can still be in use by other requesting entities.

When a requesting entity joins a new cloud service, step 335 can execute where the new cloud service is added to the user/service membership data for the requesting entity. It can be determined in step 340 if the federated trust library already accounts for the relationships between the new cloud service and the cloud services that the requesting entity already subscribes.

When the federated trust library already contains entries that cover relationships between the new and existing cloud services, step 345 can execute where the trusted cloud service consolidator can take no further action. When one or more relationships are not already contained in the federated trust library, inter-service trust information can be requested for the new cloud service relationships in step 350. In step 355, the federated trust library can be updated with the received inter-service trust information.

Figure 4:
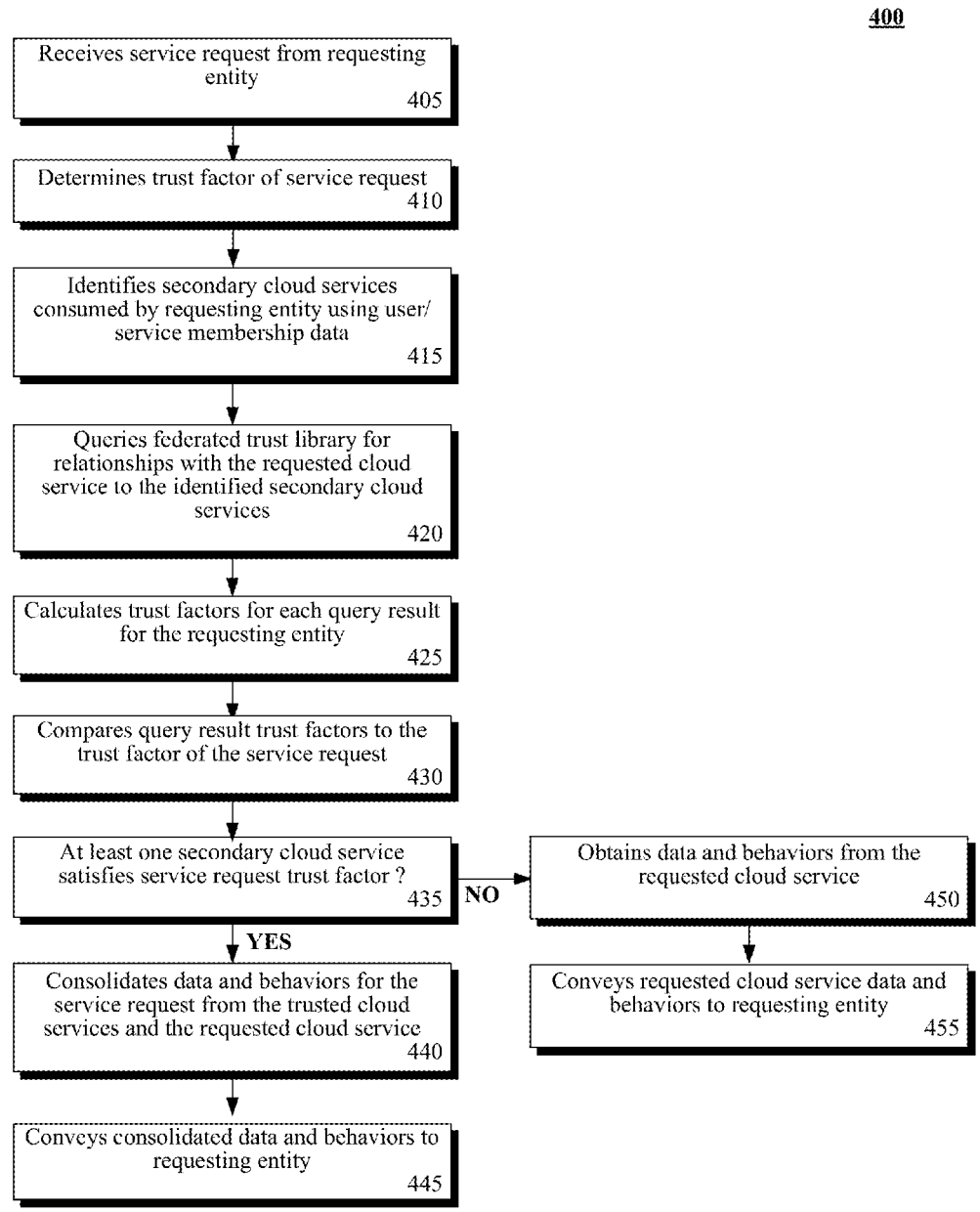
FIG. 4 is a flowchart of a method outlining the consolidation of cloud service data and behaviors by the trusted cloud service consolidator in accordance with embodiments of the inventive arrangements disclosed herein.

FIG. 4 is a flowchart of a method 400 outlining the consolidation of cloud service data and behaviors by the trusted cloud service consolidator in accordance with embodiments of the inventive arrangements disclosed herein. Method 400 can be performed within the context of system 100 and/or as a specific embodiment of step 215 of method 200.

Method 400 can begin in step 405 where the trusted cloud service consolidator can receive a service request from a requesting entity. The trust factor for the service request can be determined in step 410. Step 410 can utilize contextual data regarding the requesting entity and/or service request.

In step 415, secondary cloud services that are also consumed by the requesting entity can be identified in the user/service membership data. The federated trust library can then be queried for relationships with the requested cloud service to the identified secondary cloud services in step 420.

In step 425, trust factors can be calculated for each query result from the user/service membership data for the requesting entity. The trust factors of the query results can be compared to the trust factor of the service request in step 430. In step 435, it can be determined if at least one secondary cloud service satisfies the service request trust factor.

When at least one secondary cloud service satisfies the trust factor of the service request, step 440 can execute where the data and behaviors from the requested and trusted cloud services can be consolidated for the service request. The consolidated data and behaviors can be conveyed to the requesting entity in step 445.

When none of the secondary cloud services satisfy the trust factor of the service request, step 450 can execute where the data and behaviors from only the requested cloud service can be obtained. The requested cloud service data and behaviors can then be conveyed to the requesting entity in step 455.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for consolidating cloud service data and behaviors comprising:
one or more non-transitory storage mediums storing program instructions;
one or more processors for executing the program instructions;
a plurality of cloud services, comprising at least a portion of the program instructions, operating in a cloud computing environment, wherein the plurality of cloud services provide data and behaviors in response to service requests;
a plurality of user/service membership data that associates a plurality of requesting entities with cloud services to which the plurality of requesting entities subscribe;
a federated trust library containing inter-service trust information for the cloud services contained in the user/service membership data, wherein the inter-service trust comprises a directionality property for defining a first level of trust from a first cloud service to a second cloud service and a second level of trust from the second cloud service to the first cloud service, wherein the first level of trust is different from the second level of trust; and
a trusted cloud service consolidator, comprising at least a portion of the program instructions, configured to selectively consolidate the data and behaviors from cloud services into a unified data structure in response to a service request, wherein the cloud services are selected based upon a trust factor synthesized from the federated trust library, wherein the trust factor is a quantification of a level of confidence between a cloud service specified in the service request and other cloud services that a requesting entity consumes, as defined in the user/service membership data.

2. The system of claim 1, wherein the trusted cloud service consolidator further comprises:
a data manager, comprising at least a portion of the program instructions, configured to create and maintain contents of the user/service membership data and federated trust library; and
a trust factor calculator r, comprising at least a portion of the program instructions, configured to calculate the trust factor for the service request and the trust factor for the other cloud services that the requesting entity consumes.

3. The system of claim 1, further comprising:
a user interface, generated by executing at least a portion of the program instructions, provided by at least one processor executing user interface program instructions for presenting the unified data structure to the requesting entity.

4. The system of claim 1, wherein the trusted cloud service consolidator is an integrated component of a cloud service within the plurality of cloud services.

5. The system of claim 1, wherein the trusted cloud service consolidator is a distinct cloud service within the plurality of cloud services.

6. The system of claim 3, wherein the trusted cloud service consolidator is Web service operating outside of the cloud computing environment.

7. A computer program product for consolidating cloud service data and behaviors comprising:
one or more non-transitory storage mediums storing program instructions, which are executable by one or more processors;
a plurality of cloud services, comprising at least a portion of the program instructions, operating in a cloud computing environment, wherein the plurality of cloud services provide data and behaviors in response to service requests;
a plurality of user/service membership data, stored in the one or more non-transitory storage mediums, that associates a plurality of requesting entities with cloud services to which the plurality of requesting entities subscribe;
a federated trust library containing inter-service trust information for the cloud services contained in the user/service membership data, wherein the inter-service trust comprises a directionality property for defining a first level of trust from a first cloud service to a second cloud service and a second level of trust from the second cloud service to the first cloud service, wherein the first level of trust is different from the second level of trust; and a trusted cloud service consolidator, comprising at least a portion of the program instructions, configured to selectively consolidate the data and behaviors from cloud services into a unified data structure in response to a service request, wherein the cloud services are selected based upon a trust factor synthesized from the federated trust library, wherein the trust factor is a quantification of a level of confidence between a cloud service specified in the service request and other cloud services that a requesting entity consumes, as defined in the user/service membership data.

8. The computer program product of claim 7, wherein the trusted cloud service consolidator further comprises:

a data manager, comprising at least a portion of the program instructions, configured to create and maintain contents of the user/service membership data and federated trust library; and a trust factor calculator r, comprising at least a portion of the program instructions, configured to calculate the trust factor for the service request and the trust factor for the other cloud services that the requesting entity consumes.

9. The computer program product of claim 7, further comprising:

a user interface, generated by executing at least a portion of the program instructions, provided by at least one processor executing user interface program instructions for presenting the unified data structure to the requesting entity.

10. The computer program product of claim 7, wherein the trusted cloud service consolidator is an integrated component of a cloud service within the plurality of cloud services.

11. The computer program product of claim 7, wherein the trusted cloud service consolidator is a distinct cloud service within the plurality of cloud services.

12. The computer program product of claim 9, wherein the trusted cloud service consolidator is Web service operating outside of the cloud computing environment.

* * * * *